United States Patent [19]

Caldas

[11] Patent Number: 4,723,971
[45] Date of Patent: Feb. 9, 1988

[54] INDUSTRIAL VACUUM CLEANER

[76] Inventor: Ladislau B. Caldas, Rua 7 de Julho, No. 196, Sao Paulo - SP, Brazil

[21] Appl. No.: 921,773

[22] Filed: Oct. 21, 1986

[51] Int. Cl.⁴ .............................................. B01D 50/00
[52] U.S. Cl. ...................................... 55/276; 55/334; 55/356; 55/357; 15/340; 15/347; 15/353
[58] Field of Search ................. 55/276, 356, 357, 320, 55/335, 337, 429, 373; 15/340, 347, 353; 248/137, 140

[56] References Cited

U.S. PATENT DOCUMENTS

| | | | |
|---|---|---|---|
| 1,255,484 | 2/1918 | Stephens | 248/137 |
| 1,507,010 | 9/1924 | Sutton | 55/356 |
| 1,839,729 | 1/1932 | Barels | 248/137 |
| 2,643,732 | 6/1953 | Keen | 55/379 |
| 2,952,434 | 9/1960 | Blanchard | 248/137 |
| 3,903,565 | 9/1975 | Hicks | 15/340 |
| 4,010,015 | 3/1977 | Brown | 15/340 |

Primary Examiner—Bernard Nozick
Attorney, Agent, or Firm—Michael J. Striker

[57] ABSTRACT

An industrial vacuum cleaner, having a structure in the form of a trolley with a platform (1) on wheels (2) supporting a base (3) on which is seated an electric motor (4) connected to a radial compressor or vacuum pump (5). Two horizontal tubes (16) are connected to the front of the platform (1) and joined by two crossbars (17). At the extremities of the two horizontal tubes (16) there are casters (38). Both crossbars (17) are connected to two vertical tubes (18 and 19) of the same height, with U-shaped sockets (20 and 21) at the top end. These U-sockets are provided for slotting in segments of coaxial axle pins (22 and 23) which are placed on diametrically opposite sides of the drum (9). There are also handles (24) on either side of the drum.

20 Claims, 7 Drawing Figures

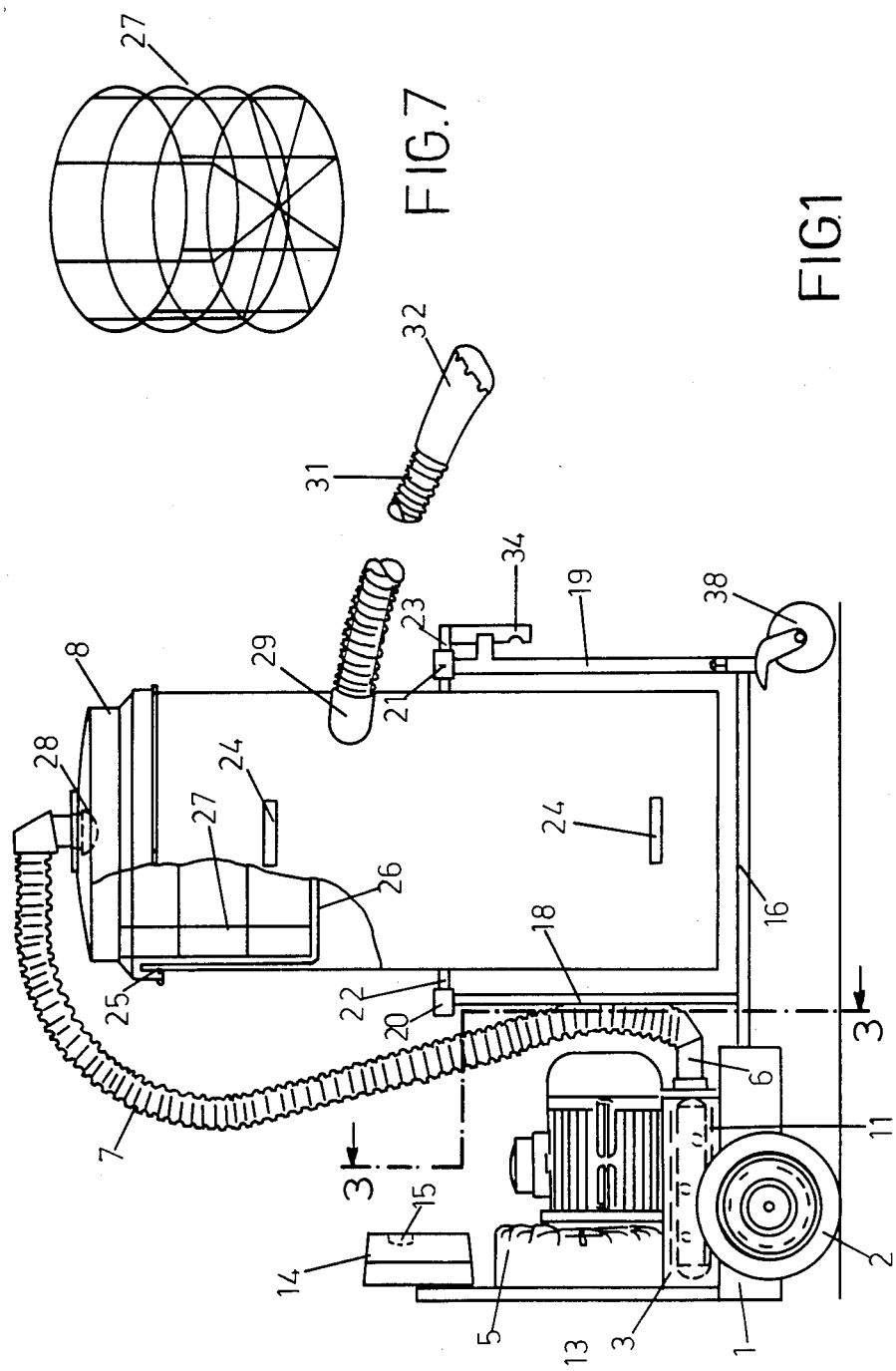

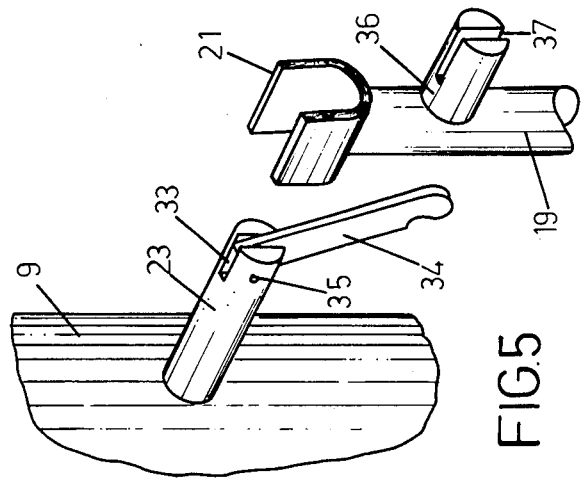
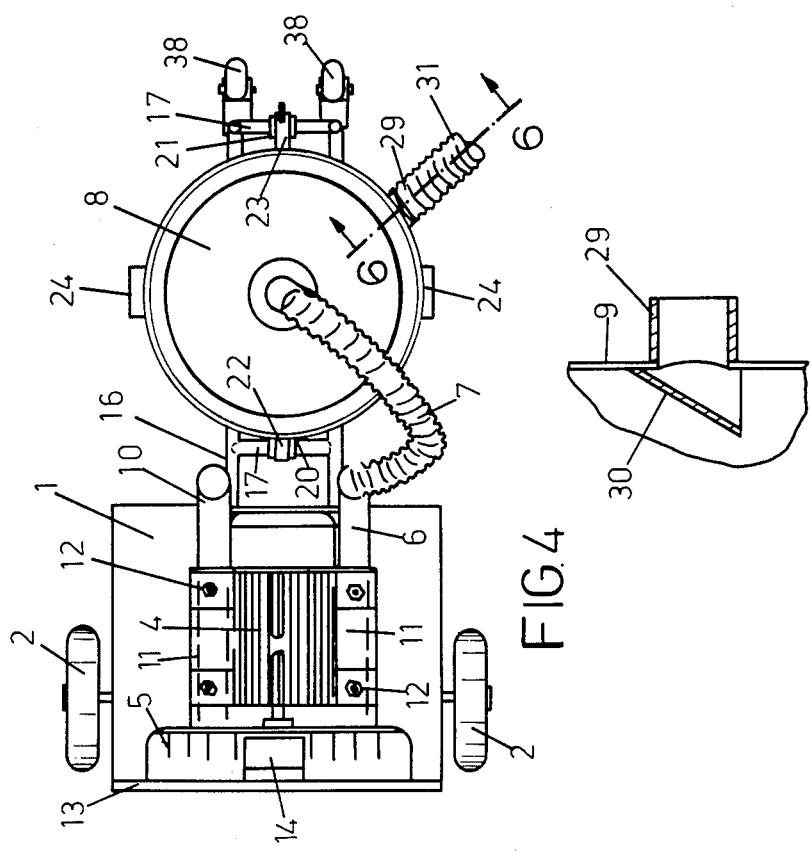

INDUSTRIAL VACUUM CLEANER

FIELD OF THE INVENTION

The present patent application refers to an industrial vacuum cleaner.

SUMMARY OF THE INVENTION

It is an object of the present invention to provide an industrial vacuum cleaner.

In keeping with this object, and others which will become apparent hereafter, one aspect of the invention resides briefly stated in an industrial vacuum cleaner for removing particles from a surface, the industrial vacuum cleaner comprising: means for suctioning air; a platform supporting said suctioning means; a tipping drum having an inlet and an outlet; tubular means for connecting said outlet with said suctioning means so that air is passable from said inlet to said outlet of said tipping drum and through said tubular means to said suctioning means; and means for pivotally supporting said tipping drum by said platform including two U-shaped socket elements and two pin elements pivotally fittable with said U-shaped socket elements, two of said elements being attached to said tipping drum and arranged diametrically opposite from each other, and the other two of said elements being supported by said platform.

Another object is to releasably lock the tipping drum into position during use.

Yet another object is to fit one or more radial compressors or vacuum pumps for additional suction power.

The novel features which are considered as charactertistic for the invention are set forth in particular in the appended claims. The invention itself, however both as to its construction and its method of operation, together with additional objects and advantages thereof, will be best understood from the following description of specific embodiments when read in connection with the accompanying drawings.

BRIEF DESCRIPTION OF THE DRAWINGS:

FIG. 1 shows a side elevation of the industrial vacuum cleaner. The upper section of the drum is shown open so as to provide a view of the cloth filter and wire holder. The latter is shown separately on the right.

FIG. 4 shows a view of the cleaner from above.

FIG. 5 shows the latch and socket seat in perspective.

FIG. 6 shows a cross section taken across section lines 6—6 of FIG. 6.

FIG. 7 shows a perspective view of a basket partially seen in FIG. 1 which is used to hold a filter.

DETAILED DESCRIPTION OF PREFERRED EMBODIMENTS

Figure 3:
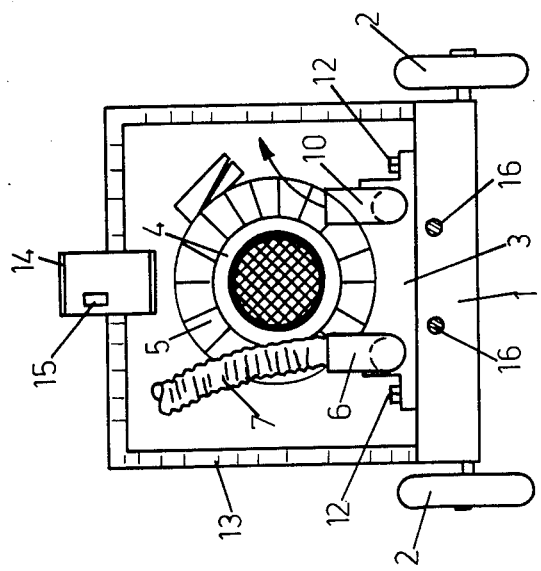
FIG. 3 shows a cross section taken across section lines 3—3 of FIG. 1.
Figure 2:
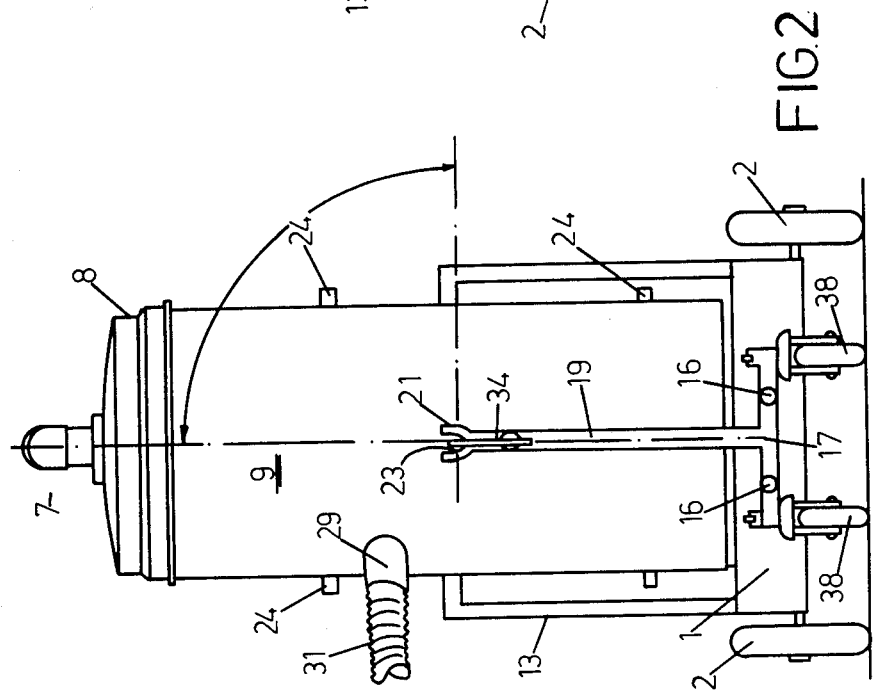
FIG. 2 shows the industrial cleaner in front elevation, with an arrow indicating the direction in which the drum is tipped when the suctioned material is removed.

This industrial vacuum cleaner comprises a structure in the form of a trolley with a platform 1 on wheels 2. On the platform a base 3 is placed to support an electric motor 4 connected to a radial compressor or vacuum pump 5. A tubular socket 6 in the form of an upturned elbow is connected to the front of the base 3. A hose 7 is connected, which runs up to the cover 8 of the tipping drum 9, to this elbow. Next to the socket 6 is connected another tubular socket 10 in the form of an upturned elbow, through which air returns to the atmosphere.

Between sockets 6 and 10 and the radial compressor 5, noise suppressors 11 are interspersed around the sides of the base. Each muffler or suppressor 11 is contained inside a perforated plate. The sides of the base 3 are fastened to the platform 1 with bolts or similar devices 12.

A control panel 14 with switch 15 is located on a square section tube frame 13 which is fastened to the platform 1.

Two horizontal tubes 16 connected by crossbars 17 are attached to the front of the platform 1. At the extremities of the horizontal tubes 16 there are casters 38.

To both crossbars 17 are connected vertical tubes 18 and 19, which terminate at the same height in U-shaped sockets 20 and 21. Coaxial axle pins 22 and 23 are fitted into and freely movable in the slot of the U-shaped sockets 20 and 21 respectively. The pins 22 and 23 are locked at diametrically opposite points virtually in the center of the outside housing of the tipping drum 9, which has handles 24.

The brim 25 of the filter 26, which consists of a cloth bag, fits over the edge of the top opening of the drum 9. The filter is housed in a cylindrical wire basket or holder 27 to prevent suction from blocking the upper filter inlet 28 under the drum lid 8.

Just above the center of the drum 9 there is a tubular socket 29 leading to a shield 30 in the form of a sloping plate fastened to the inside of the drum wall. To this tubular socket is connected a hose 31, to the extremity of which can be connected suction device of various kinds, among which the device shown at 32 in FIG. 1.

At the end of the axle pin 23 there is a diametral slot 33, inside which is fastened a latch 34, which hinges on axles pin 35. Correspondingly, at the top end of vertical tube 19, below U-socket 21, there is a perpendicular projection 36 with a diametral slot 37 at the end, into which latch 34 can be introduced.

In accordance with the present inventive idea, this industrial vacuum cleaner will be fitted with one or more radial compressors or vacuum pumps connected to the drum and providing greater suctional power.

When switch 15 is pressed, the radial compressor or vacuum pump starts up, and dirt or other material is suctioned through device 32 or others. The suctioned material enters the drum 1 and settles at the bottom of it, while the suctioned air leaves through filters 26 and 28 into the atmosphere, passing through socket 10.

When the cleaner is in operation, the drum 1 is locked in a vertical position using latch 34, which is locked into slot 37.

When the cleaner is switched off, drum 1 can be emptied by unlocking latch 34, tipping the drum and discharging its contents. The drum can also be pulled on its casters using the handles 24.

The radial compressors are used for suction or, in special cases, to blow out any dirt which may be blocking the system.

It will be understood that each of the elements described above, or two or more together, may also find a useful application in other types of industrial vacuum cleaners differing from the types described above.

While the invention has been illustrated and described as embodied in an industrial vacuum cleaner, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for the various applications without omitting features, that, from the standpoint of prior art, fairly constitute essential characteristics of the generic or specific aspects of this invention.

What is claimed is new and desired to be protected by Letters Patent is set forth in the appended claims:

1. An industrial vacuum cleaner for removing particles from a surface, the industrial vacuum cleaner comprising:
    means for suctioning air;
    a platform supporting said suctioning means;
    a tipping drum having an inlet and an outlet and an outer surface, said tipping drum being formed to receive air with particles from the surface through said inlet;
    means for cleaning the air of the particles and including a filter element in said tipping drum arranged between said inlet and said outlet, said filter element being formed to remove the particles from the air when the air passes through said filter element;
    tubular means for connecting said outlet with said suctioning means so that the air passes from said inlet through said filter element and out said outlet and then through said tubular means to said suctioning means when said suctioning means suctions the air; and
    means for pivotally supporting said tipping drum by said platform and including two U-shaped socket elements and two pin elements pivotally fittable with said U-shaped socket elements, two of said U-shaped socket and pin elements being attached to said outer surface of said tipping drum and arranged diametrically opposite from each other, and the other two of said elements being supported by said platform.

2. The industrial vacuum cleaner as defined in claim 1, wherein said suctioning means includes at least one electrical motor and at least one vacuum pump drivable by said one electrical motor.

3. The industrial vacuum cleaner as defined in claim 1, wherein said suctioning means includes at least one electrical motor and at least one radial compressor drivable by said one electrical motor.

4. The industrial vacuum cleaner as defined in claim 1, wherein said pin elements extend horizontally outward from said tipping drum and diametrically opposite from each other and coaxial with each other, said U-shaped socket elements being upwardly open and arranged so that said pin elements are simultaneously pivotally fittable into said U-shaped socket elements.

5. The industrial vacuum cleaner as defined in claim 1, wherein said platform has a front side facing said tipping drum, said pivotally supporting means further including two tubes horizontally extending from and connected to said front side, two crossbars joining said horizontal tubes together, two vertical tubes having upper ends, each of said vertical tubes extending from and connecting a respective one of said crossbars and having a height equal to each other, two of said elements being connected to a respective two of said upper ends.

6. The industrial vacuum cleaner as defined in claim 1; further comprising:
    a control panel: and
    means for supporting said control panel including a vertical frame having an upper horizontal portion, said frame being attachable to said platform and said control panel being mountable on said upper horizontal portion.

7. The industrial vacuum cleaner as defined in claim 1, further comprising:
    a plurality of handles mounted on said tipping drum.

8. The industrial vacuum cleaner as defined in claim 1, wherein said tipping drum has a central area located in a horizontal plane, said inlet being arranged above said central area; further comprising:
    an internal shield extending inward of said tipping drum and arranged to direct said air passing through said inlet downward.

9. The industrial vacuum cleaner as defined in claim 1; further comprising:
    hose means connectable with said inlet and a suction element such that air is passable from said suction element through said hose means and to said inlet.

10. The industrial vacuum cleaner as defined in claim 1, further comprising:
    locking means for locking said pivotally supporting means such that said tipping drum becomes locked in a vertical position preventing pivotable movement of said tipping drum.

11. The industrial vacuum cleaner as defined in claim 1, wherein said drum has a volume to hold contents and has an opening and a movable cover closing said opening, said outlet being arranged in said cover, said cover being movable away from said opening for emptying said contents through said opening.

12. The industrial vacuum cleaner as defined in claim 11, wherein said filter element is formed with an upper brim, said drum being formed to receive said brim around said opening such that said cover is movable to close said opening on top of said brim, said cleaning means also including a basket holder housing said filter element to prevent said filter element from blocking said outlet during suction.

13. The industrial vacuum cleaner as defined in claim 12, wherein said tipping drum has a circular cross-section, said filter element being formed as a cloth bag, said brim being bendable, and said basket holder being cylindrically shaped.

14. The industrial vacuum cleaner as defined in claim 1, further comprising:
    a base mounted on said platform and supporting said suctioning means, said base having an inlet opening connectable with said tubular means and having an outlet opening for discharging the air and having passages from said suctioning means to said inlet and outlet openings.

15. The industrial vacuum cleaner as defined in claim 14, wherein said base has sides, further comprising:
    a plurality of noise suppressors interspersed along said sides between said suctioning means and said inlet and outlet openings.

16. The industrial vacuum cleaner as defined in claim 14, wherein said tubular means includes a first upturned tubular elbow connectable with and extendable outward and upward from said inlet opening, a second upturned tubular elbow connectable with and extendable outward and upward from said outlet opening, and a tubular flexible hose connectable between said first upturned tubular elbow and said tipping drum outlet.

17. The industrial vacuum cleaner as defined in claim 1, further comprising:
    means for rolling the industrial vacuum cleaner including a plurality of wheels and casters supporting said platform.

18. The industrial vacuum cleaner as defined in claim 17, wherein said platform has a front side facing said drum; and further comprising:
    two tubes extending horizontally from said front side and having an end portion spaced furthest from said front side, one of said casters mounted to a respective one of said two tubes.

19. An industrial vacuum cleaner for removing particles from a surface, the industrial vacuum cleaner comprising:
    means for suctioning air;
    a platform supporting said suctioning means;
    a tipping drum having an inlet and an outlet, said tipping drum being formed to receive air with particles from the surface through said inlet;
    means for cleaning the air of the particles and including a filter element in said tipping drum arranged between said inlet and said outlet, said filter element being formed to remove the particles from the air when the air passes through said filter element;
    tubular means for connecting said outlet with said suctioning means so that the air passes from said inlet through said filter element and out said outlet and then through said tubular means to said suctioning means when said suctioning means suctions the air;
    means for pivotally supporting said tipping drum by said platform and including two U-shaped socket elements and two pin elements pivotally fittable with said U-shaped socket elements, two of said U-shaped socket and pin elements being attached to said tipping drum and arranged diametrically opposite from each other, and the other two of said elements being supported by said platform; and
    locking means for locking said pivotally supporting means such that said tipping drum becomes locked in a vertical position preventing pivotable movement of said tipping drum, said locking means including a hinged latch pivotally connected to one of said U-shaped socket and pin elements, and a receiving element connected to a second of said U-shaped socket and pin elements and arranged for receiving said hinged latch for locking said latch into position.

20. The industrial vacuum cleaner as defined in claim 19, wherein said U-shaped socket elements are supported by said platform, one of said pin elements having a free end with a slot holding said hinged latch pivotally; further comprising:
    means for supporting at least one of said U-shaped socket elements from said platform including at least one verticle tube having an upper end holding said one U-shaped socket element; and
    a projection extending outward perpendicularly from said one vertical tube, said projection having said receiving element formed as a vertical diametral slot at an end and being arranged below said one U-shaped socket element such that said latch is movable into said vertical diametral slot for locking said latch into position.

* * * * *